(12) United States Patent
Harstead et al.

(10) Patent No.: US 6,327,400 B1
(45) Date of Patent: Dec. 4, 2001

(54) PROTECTION SCHEME FOR SINGLE FIBER BIDIRECTIONAL PASSIVE OPTICAL POINT-TO-MULTIPOINT NETWORK ARCHITECTURES

(75) Inventors: Edward E. Harstead, New York, NY (US); Louis Viktor Hazeu, Almere (NL)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/412,524

(22) Filed: Oct. 5, 1999

(51) Int. Cl.⁷ .................. G02B 6/26; G02B 6/42
(52) U.S. Cl. ........................ 385/22; 385/16
(58) Field of Search .............. 385/16–24; 359/110, 359/128, 119, 124, 125

(56) References Cited

U.S. PATENT DOCUMENTS 5,809,187 * 9/1998 Peck, Jr. et al. .................. 385/24

* cited by examiner

*Primary Examiner*—Phan T. H. Palmer
(74) *Attorney, Agent, or Firm*—Synnestvedt & Lechner LLP

(57) ABSTRACT

A point-to-multipoint protected network and related equipment for providing protection against fiber and/or interface failures while reducing or eliminating fiber redundancy requirements. The head end is coupled to a ring network comprised of one fiber via a passive splitter which sends the downstream signal out in both the clockwise and counter-clockwise directions. Each network terminal is coupled to the ring through an optical circuit comprising a 1:2 optical switch and two passive optical taps. The terminal is coupled to the single terminal side of the 1:2 switch while the two terminals of the double terminal side of the switch are coupled to the ring in opposing directions, i.e., clockwise and counterclockwise, respectively. The two terminals of the double terminal side of the optical switch are each coupled to the ring via a passive optical tap. Other ring and star network embodiments are disclosed.

39 Claims, 10 Drawing Sheets

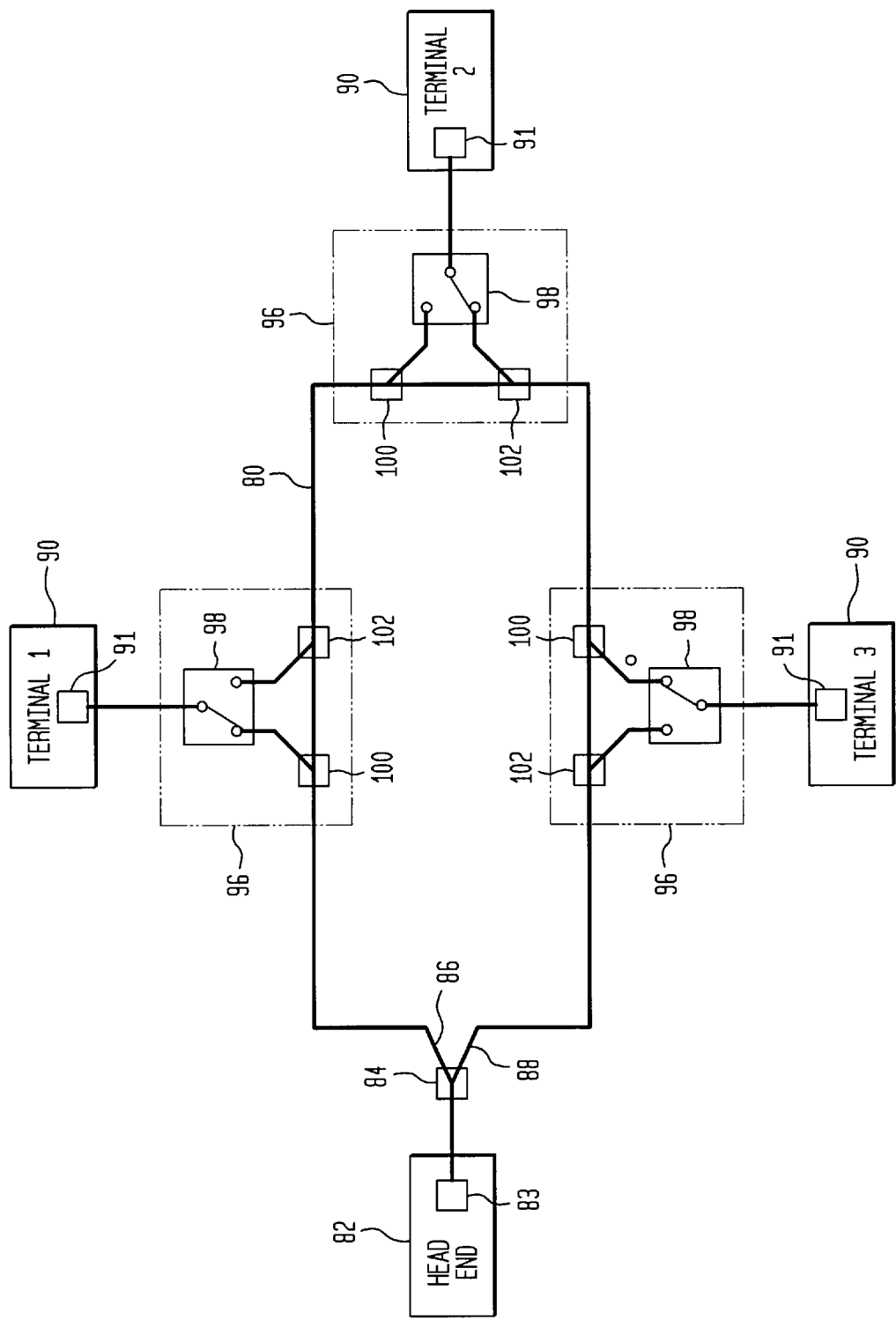

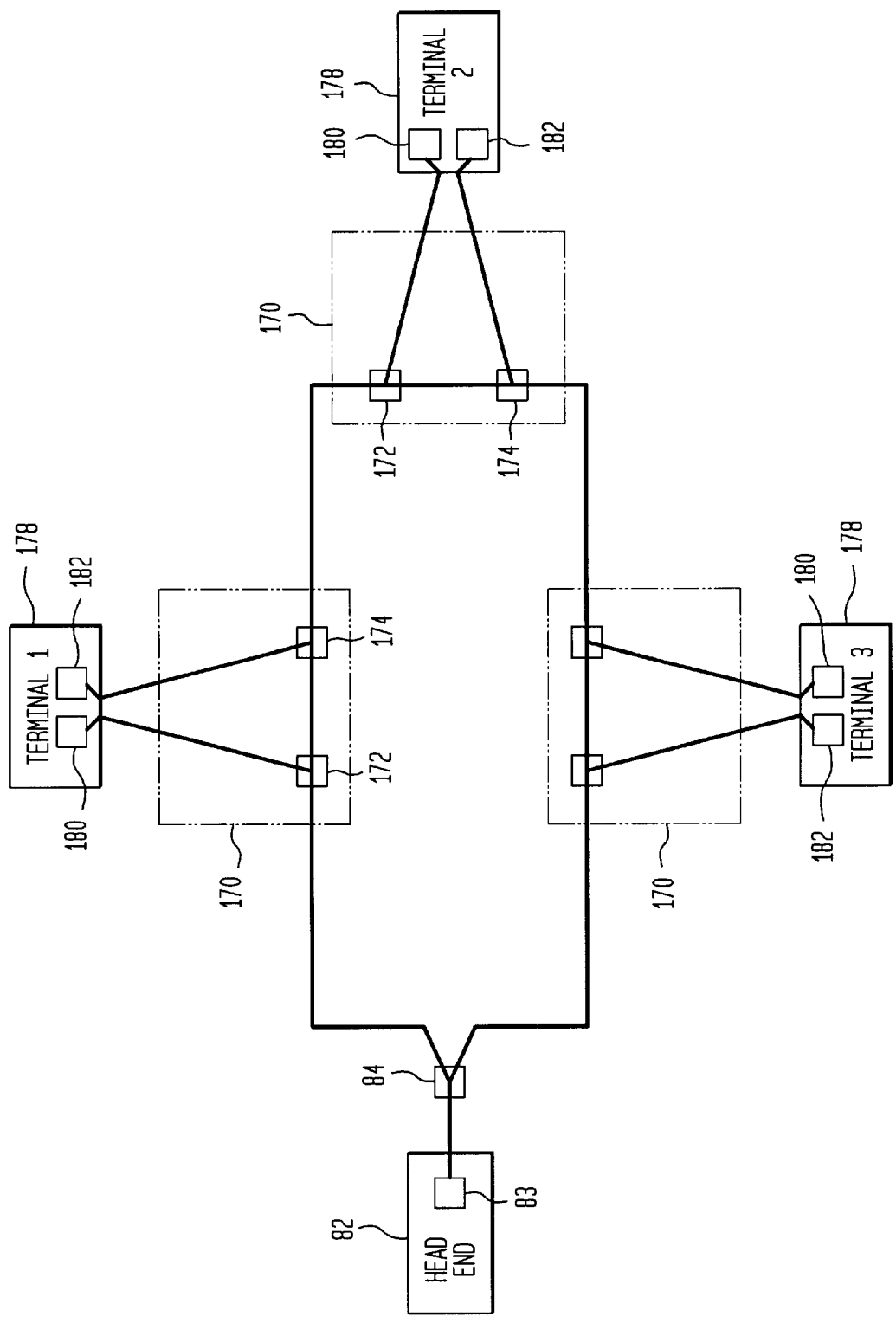

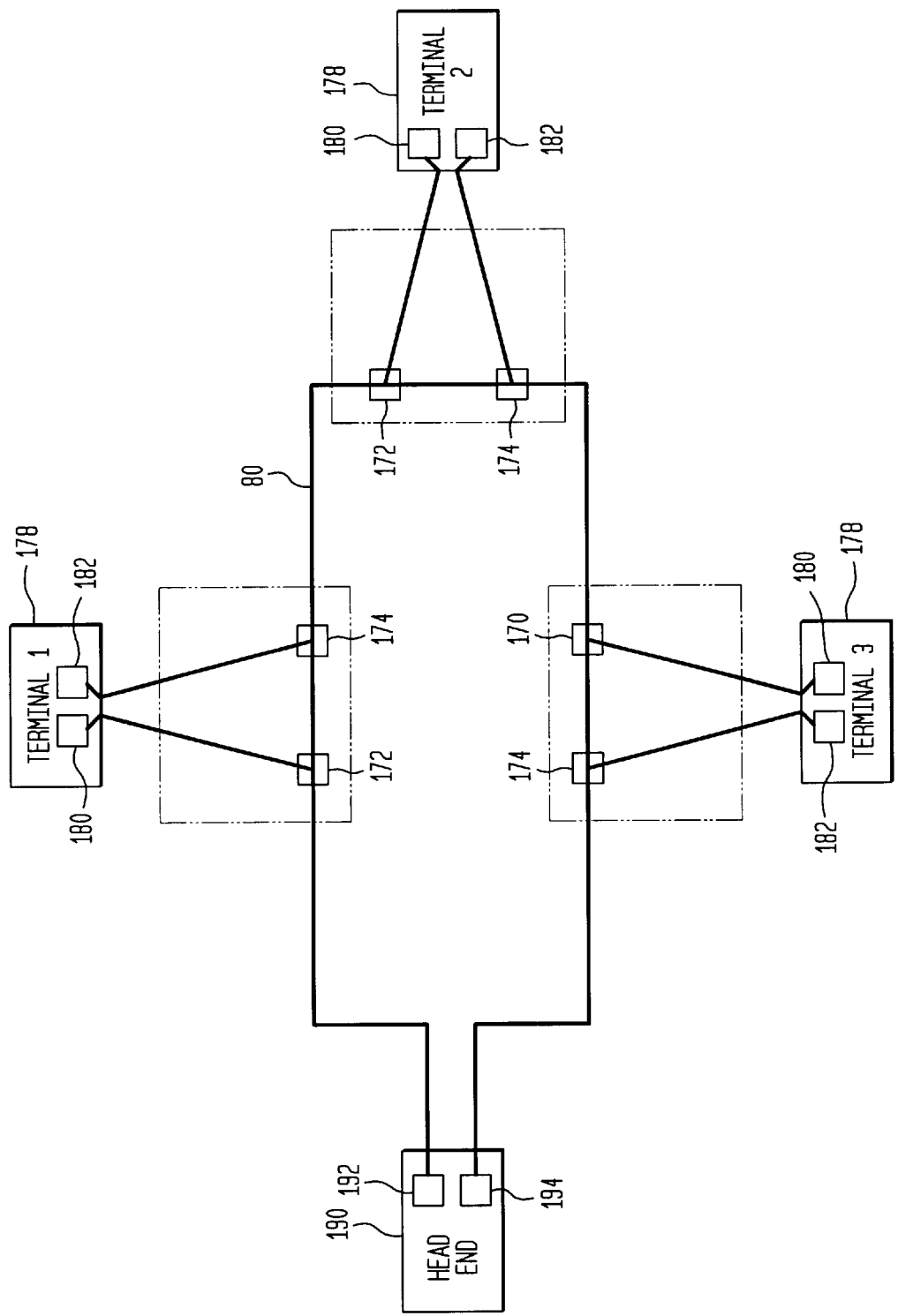

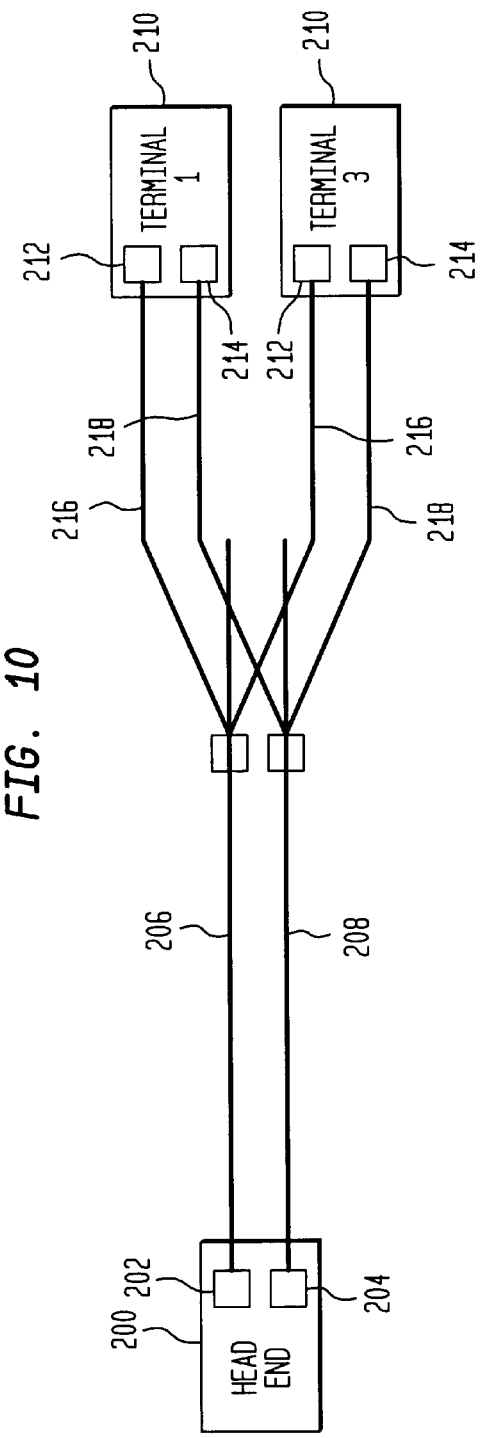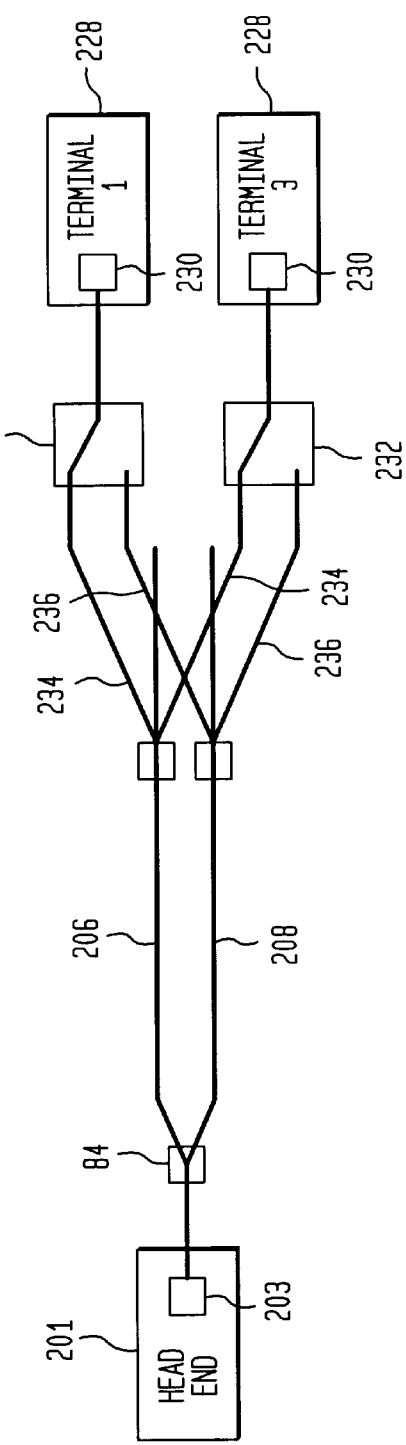

PROTECTION SCHEME FOR SINGLE FIBER BIDIRECTIONAL PASSIVE OPTICAL POINT-TO-MULTIPOINT NETWORK ARCHITECTURES

FIELD OF THE INVENTION

The invention pertains to passive optical point-to-multipoint optical networks. More particularly, the invention pertains to protection schemes for such networks.

BACKGROUND OF THE INVENTION

A passive optical network (PON) is a point-to-multipoint optical fiber network having no active (i.e., powered) components in the inter-node portion of the network. Fiber optic networks are becoming increasingly common because of the many advantages of optical fiber over standard electrical cables, such as increased bandwidth and low signal degradation.

Many users of such networks require extremely high reliability of the network. That is, the network must be operational an extremely high percentage of the time. Such users requiring very high network reliability might include the military, banks and other financial institutions, and civilian air traffic control systems. In general, communications over a network can be interrupted by two general types of failures, namely, a fiber break failure and an interface failure. As used herein, the term interface failure refers to a failure at the interface equipment of a network terminal of the network.

Of particular interest in the present specification are point-to-multipoint networks. The term "point-to-multipoint" refers to a network architecture in which all communications between nodes are routed through a control node, typically termed the head end. In this specification, the control node is termed the head end and all other network nodes are termed network terminals.

Point-to-multipoint networks may take on various configurations including a tree configuration, a bus configuration, a star configuration, and a ring configuration. They also may use any type of communication protocol, including time division multiple access (TDMA) protocols, code division multiple access (CDMA) protocols, contention protocols (e.g., CSMA-CD used for Ethernet), etc. An example of an ATM passive optical network (APON) using TDMA is described in ITU-T G983.1.

In order to provide extremely high reliability, such networks typically employ redundant architectures. For instance, in order to assure high reliability against fiber breaks, a network would be designed to provide two separate and independent fiber routes between each network terminal and the head end.

To provide protection against interface failures, each node of the network, including the head end, would be provided with redundant interfaces. Thus, if one interface failed, the node could switch to use the other interface.

Generally, it has been believed that, for networks requiring fiber and/or interface protection (i.e., redundancy), a ring architecture is most efficient. However, protected star and other networks are known.

FIGS. 1A, 1B and 1C illustrate unprotected star, tree and bus optical network architectures, respectively.

Commonly, the multiple fibers connecting a network terminal to the head end in a protected network are routed over geographically different routes. This is because the cause of a fiber break frequently is a localized event, such as severe weather, insurrection, accidental human breakage (for instance, due to construction), etc.

Examples of redundancy/protection schemes can be found, for example, in appendix D of ITU-T G983.1. J. L. De Groote, D. A. Buise, H. K. Dedecker, F. M. Louagie and H. F. Slabbinck, *Redundancy and Protection—Switching in APON Systems, Broadband Access and Technology*, W. Faulkner and J. L. Hammer (IDS.), 1999 also discloses several architectures for protected APONs.

FIGS. 2, 3 and 4 illustrate some of the protected APON architectures disclosed in the aforementioned article. For instance, FIG. 2 illustrates a partial protection scheme in which the head end and the fibers 28 and 30 between the head end and the splitter 26 is protected. Particularly, the head end 20 includes two interfaces 22 and 24 to the optical network. Each of those interfaces is coupled to a 2:N splitter 26 via a fiber 28 and 30, respectively, where N is the number of network terminals. The splitter 26 couples to each of the terminals, e.g., terminals 32-1 and 32-N through a fiber, e.g., 34-1 and 34-N and an interface, e.g., 36-1 and 36-N, respectively. A failure of one of the interfaces 22 or 24 at head end 20 or in fibers 28, 30 is non-fatal since the other interface can take over. However, this scheme provides no protection for failure of an interface of one of the network terminals 32-1 through 32-N. Also, it does not provide protection for any fiber breaks other than in fiber portions 28 and 30.

FIG. 3 illustrates a fully redundant, i.e., fully protected, APON network architecture. In this architecture, the head end 40 includes two optical interfaces 42 and 44. Each optical interface 42 and 44 is coupled via a fiber 46 and respectively, to a 1:N optical splitter, 50 and 52 respectively. Each optical splitter 50 and 52 is coupled to each network terminal 54-1 through 54-N via a separate fiber 56-1 through 56-N and 57-1 through 57-N and optical interface 58-1 through 58-N and 60-1 through 60-N at the terminal. For instance, splitter 50 is coupled to network terminal 54-1 via fiber 56-1 and interface 58-1. Splitter 50 is coupled to network terminal 54-N via fiber 56-N and interface 58-N. This configuration provides full redundancy for interface failure at any of the network terminals and the head end as well as for a fiber break anywhere in the network.

FIG. 4 illustrates a third protected network topology. Whereas FIGS. 2 and 3 illustrate star network topologies, FIG. 4 discloses a ring network topology. FIG. 4 shows a route redundant architecture having optical interface protection at the head end and full fiber break protection. It does not have optical interface protection at the terminals. Particularly, FIG. 4 illustrates a route redundant architecture with different drop sections along a ring network. The head end 80 has redundant optical interfaces 82 and 84 with each of the optical interfaces 92 and 84 coupled to a 1:K splitter 83, 85 with each output fiber 90, 92 and 94 forming a ring between the two splitters. K is the number of drop sections and therefore also the number of fibers. Each fiber 90, 92 and 94 couples to one or more network terminals 96, 98 or 100 through one of the drop sections. Each drop section includes a 2:M splitter 102, 104 and 106, where M is the number of network terminals coupled to the ring via that splitter. Accordingly, each group of network terminals coupled to a 2:M splitter can communicate on the ring in either the clockwise or counterclockwise direction.

In this ring architecture, the network is fully protected against optical interface failure at the head end or fiber failure anywhere between the drop sections (i.e., the 2:M splitters) and the head end. There is no protection, however, for optical interface failure at the network terminals or in the fiber sections between the network terminals and the 2:M splitters, e.g., fiber sections 112, 114.

Providing multiple fiber routes between network terminals and the head end is expensive, particularly when the fibers are laid along different routes. Further, providing redundant optical interfaces is expensive since interface equipment costs are doubled. Further, there is additional design and equipment costs associated with the circuitry and software that must be provided for switching between the redundant interfaces.

Accordingly, it is an object of the present invention to provide a low cost protection scheme for a point-to-multipoint optical network.

It is a further object of the present invention to provide a network that is fully protected against fiber breaks without the need for redundant fibers.

SUMMARY OF THE INVENTION

The invention provides circuitry for coupling network nodes to a passive network comprised of a single fiber that provides substantial protection against fiber breaks and/or optical interface failure on the network without the need for a second fiber. In a most preferred embodiment of the invention, for instance, the head end has a single optical interface to a ring network comprising a single fiber ring. The optical interface is coupled to the network through a 1:2 passive optical splitter such that a single downstream signal is split and placed on the ring in both the clockwise and counterclockwise directions. Likewise, the head end can receive upstream data from both the clockwise and counterclockwise directions on the ring. Each network terminal can be selectively coupled to the ring in either directional configuration. Particularly, each network terminal is coupled to the ring via a circuit comprising a 1:2 optical switch and two passive optical taps. The network terminal is coupled to the single terminal side of the optical switch, the first terminal of the double terminal side of the optical switch is coupled to the ring through a first passive optical tap so that it can receive in the clockwise direction and transmit in the counterclockwise direction with respect to the head end. The second terminal of the double terminal side of the switch is coupled to the ring through a second passive optical tap, but in the opposite direction, i.e., so that it receives from the head end in the counterclockwise direction and transmits to the head end in the clockwise direction.

In the absence of any fiber break, all the terminals may be coupled in the same directional configuration, e.g., to receive data from the head end (i.e., downstream communications) in the clockwise direction and transmit to the head end (i.e., upstream communications) in the counterclockwise direction. However, this is not necessary. When a fiber break occurs, all network terminals on the far side of the break from the head end, switch the corresponding optical switch in order to reverse its directional configuration. Accordingly, the network is fully protected against any single fiber break.

The architecture can be adapted to also provide protection for optical interfaces. For instance, the 1:2 optical switch can be replaced with first and second redundant optical interfaces, each coupled to one of the passive optical taps.

BRIEF DESCRIPTION OF THE DRAWINGS

FIG. 6a is a block diagram of a protected passive optical ring network in accordance with the first embodiment invention illustrating the condition of the network terminal optical interfaces when different network terminals are using opposite directional communication configurations.

FIG. 7 is a block diagram of a passive optical ring network in accordance with a second embodiment of the present invention.

FIG. 8 is a block diagram of a passive optical ring network in accordance with a third embodiment of the present invention.

FIG. 10 is a block diagram of a passive optical star network in accordance with the prior art.

FIG. 11 is a block diagram of a passive optical star network in accordance with a fifth embodiment of the present invention.

DETAILED DESCRIPTION OF THE INVENTION

Each illustration of the present invention herein will be provided in connection with a network comprising two or three network terminals for sake of simplicity. However, it should be understood that most networks will have more terminals and that the invention is readily expandable to a network having any number of network terminals, subject to the optical loss budget.

Figures 1A, 1B, 1C:
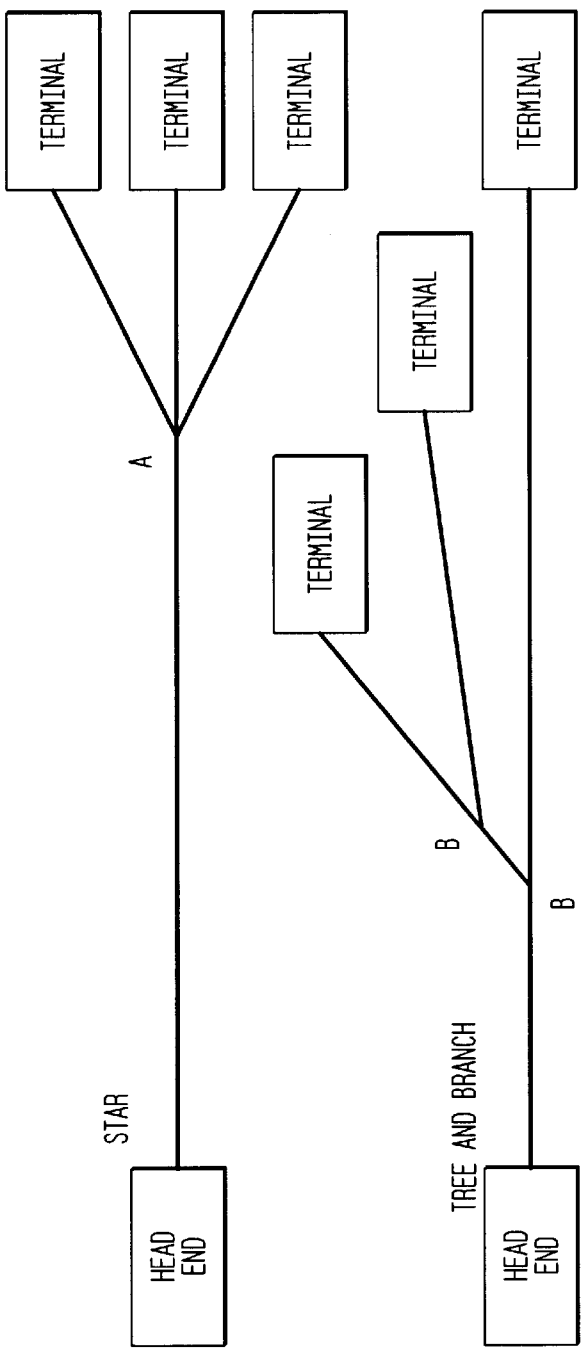
FIG. 1A is a block diagram illustrating a point-to-multipoint network utilizing a star topology in accordance with the prior art.
FIG. 1B is a block diagram illustrating a point-to-multipoint network Utilizing a tree topology in accordance with the prior art.
FIG. 1C is a block diagram illustrating a point-to-multipoint network utilizing a bus topology in accordance with the prior art.
Figure 2:
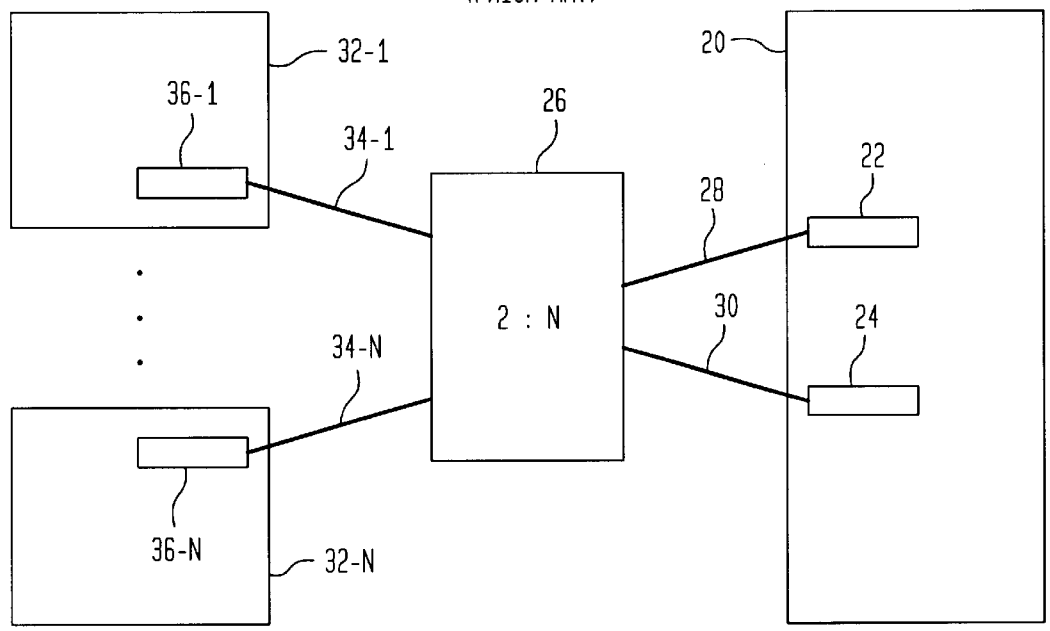
FIG. 2 is a block diagram illustrating a star point-to-multipoint network employing a first protection scheme in accordance with the prior art.
Figure 3:
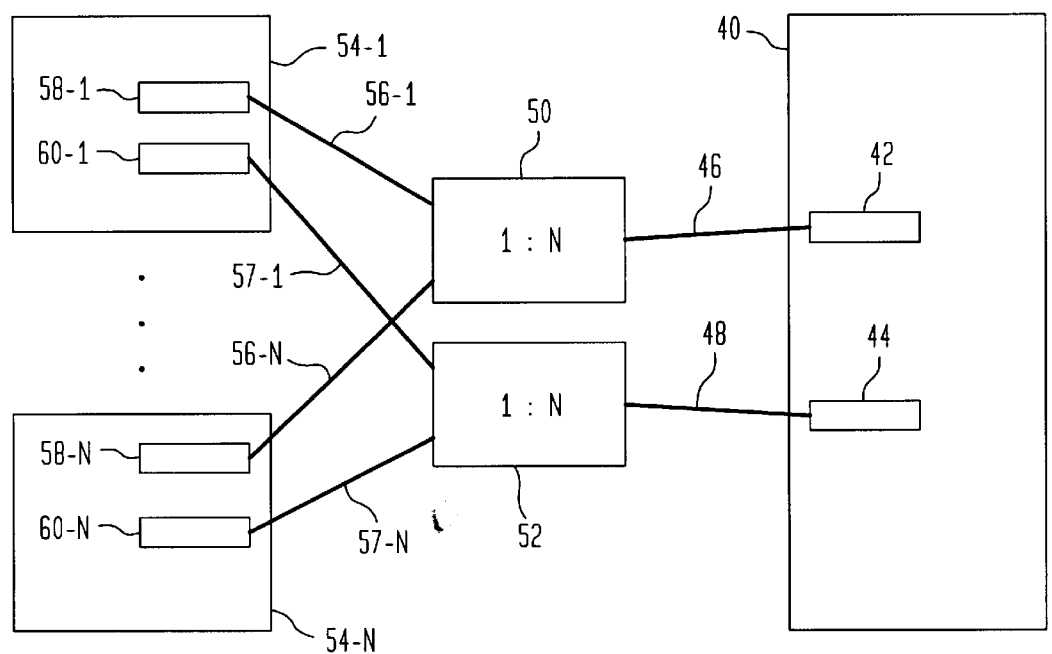
FIG. 3 is a block diagram illustrating a star point-to-multipoint network employing a second protection scheme in accordance with the prior art.
Figure 4:
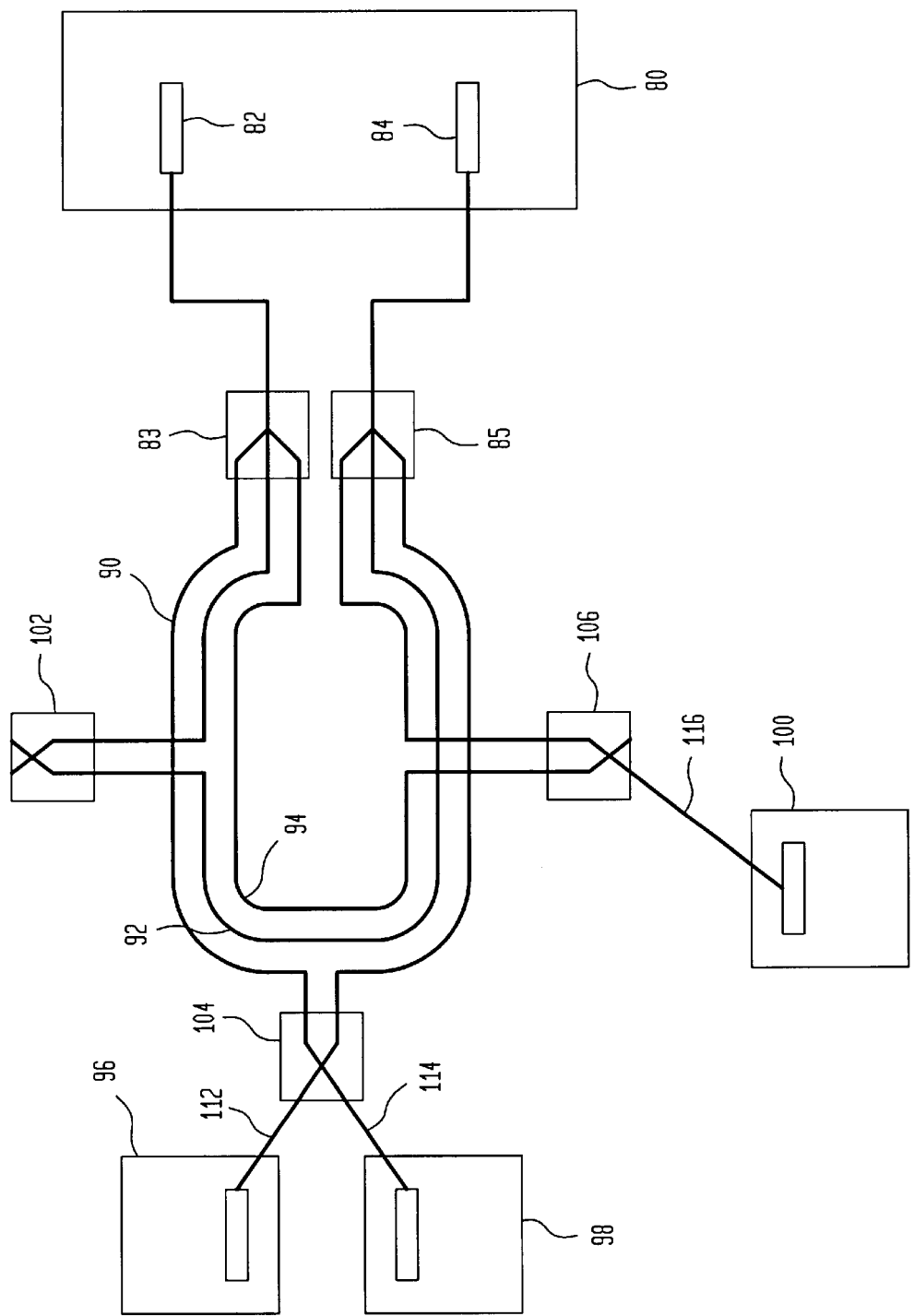
FIG. 4 is a block diagram illustrating a ring point-to-multipoint network employing a third protection scheme in accordance with the prior art.
Figure 5:
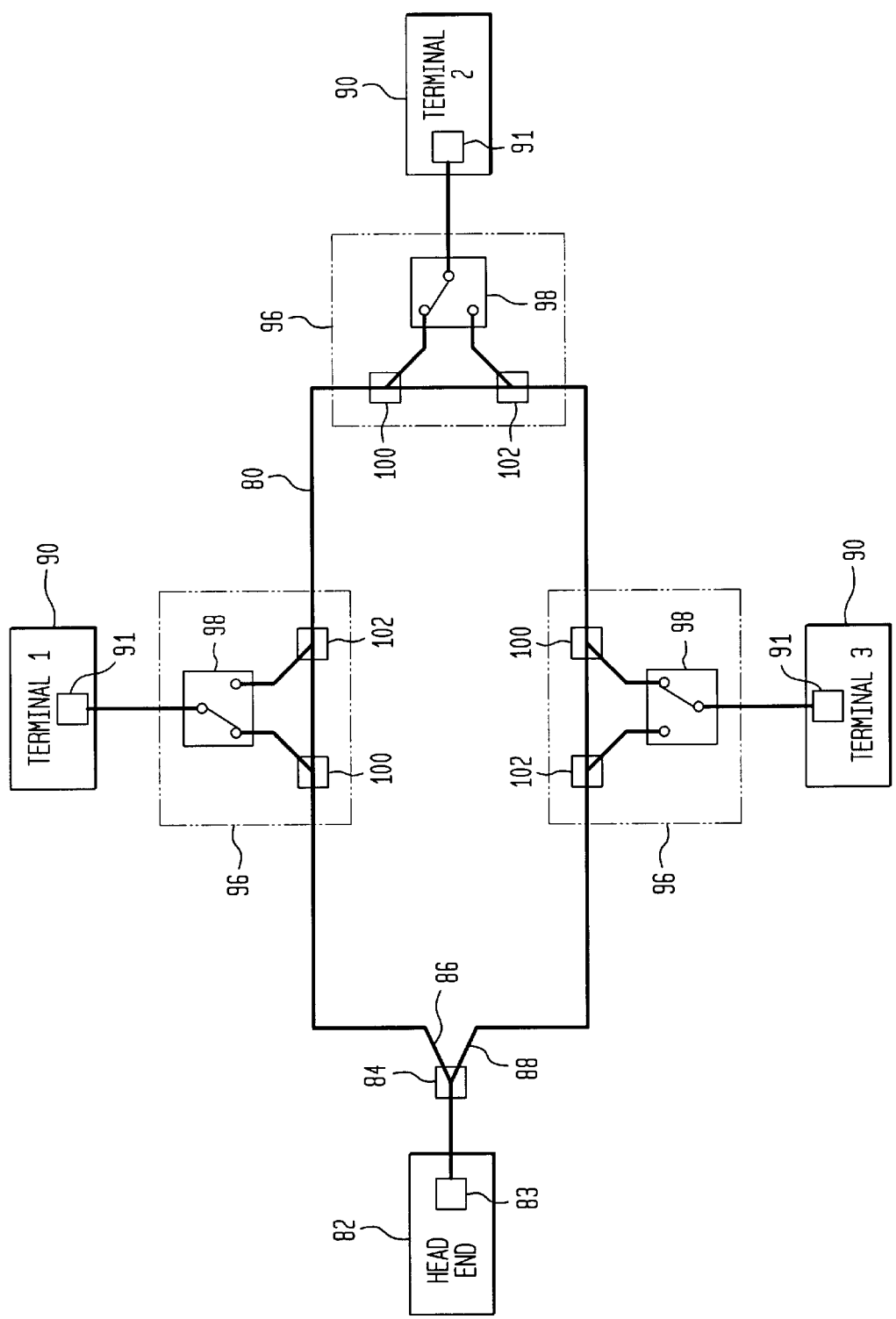
FIG. 5 is a block diagram illustrating a protected point-to-multipoint passive optical ring network in accordance with a first embodiment of the present invention.

FIG. 5 is a block diagram illustrating a first embodiment of the present invention. The passive optical network comprises a single optical fiber 80 formed into a ring configuration. The head end 82 couples to both ends of the fiber ring 80 via a single optical interface 83 and a passive 1:2 optical splitter 84. The head end is coupled to the single terminal side of the optical splitter 84. Connector 86 on the double terminal side of the 1:2 optical splitter 84 is coupled to one end of the ring 80 so as to transmit in the clockwise direction and receive in the counterclockwise direction. The second connector 88 of the 1:2 passive optical splitter 84 is coupled to the other end of the ring 80 so as to transmit in the counterclockwise direction and receive in the clockwise direction. Since a passive 1:2 optical splitter is used, all transmissions from the head end are sent out on the fiber ring 80 in both the clockwise and counterclockwise directions. Likewise, the head end receives all information transmitted by the network terminals 90 whether transmitted in the clockwise or counterclockwise direction.

Each network terminal 90 is coupled to the ring 80 via a circuit 96. The circuit 96 comprises a 1:2 optical switch 98 and two passive optical taps 100 and 102. The single terminal side of the switch 98 is coupled to the optical interface 91 of the associated network terminal 90. Each of the two terminals of the double terminal side of the switch is coupled to the ring 80 via one of the passive optical taps 100 or 102. One of the taps is coupled to the ring in one directional configuration (e.g., to transmit to the head end in the counterclockwise direction and receive from the head end in the clockwise direction) and the other tap is coupled to the ring 80 in the opposite directional configuration.

In the absence of any faults in the optical fiber 80, all of the optical switches 98 may be set in any configuration. FIG. 5 for instance, illustrates a configuration in which all switches are set such that all of the network terminals communicate with the head end in the same directional configuration (upstream communication are counterclockwise and downstream communication are clockwise).

As will be described below, this scheme provides protection from fiber breaks and allows the network to operate fully when a fiber break occurs. This particular embodiment provides no protection for optical interface failures within the head end 82 or within the network terminals 90.

Figure 6:
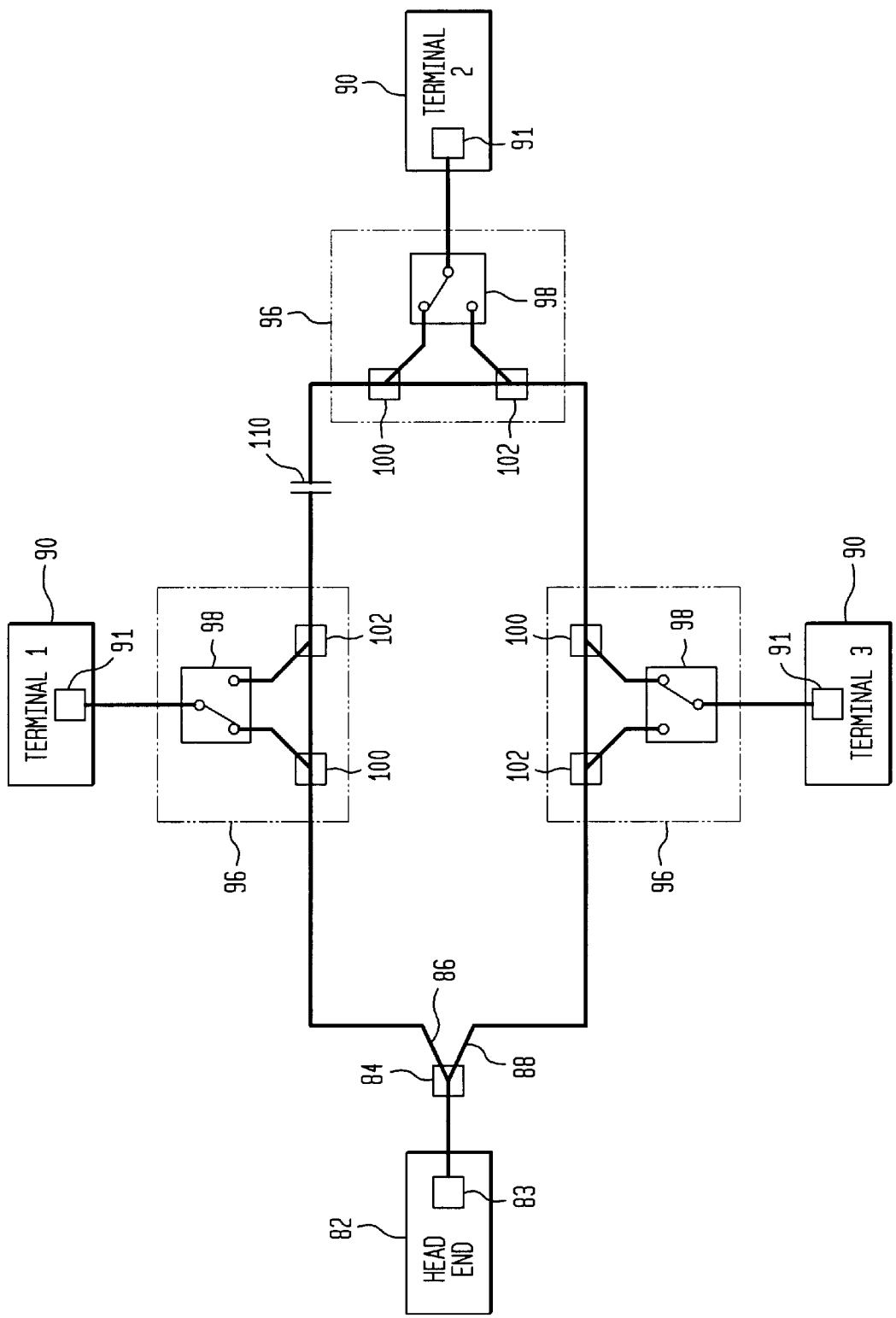
FIG. 6 is a block diagram of a protected passive optical ring network in accordance with the first embodiment illustrating the condition of the network terminal optical interfaces after a fiber break is detected.

FIG. 6 shows this embodiment of the invention illustrated by FIG. 5 in a situation where a fiber break has occurred at point 110 between terminal 1 and terminal 2. Since the head end normally continuously transmits data, terminals 2 and 3 will essentially immediately detect that they are no longer receiving downstream data from head end 82. Accordingly, the optical switches 98 of terminals 2 and 3 will be controlled to switch conditions so as to switch use to the opposite directional configuration on the fiber ring 80, i.e., switched to use optical taps 102 so that downstream communication are counterclockwise and upstream communication are clockwise. Switch 98 associated with terminal 1 remains in its existing condition. Accordingly, terminal 1 continues to communicate with the head end in the first directional configuration, while terminals 2 and 3 communicate with the head end using the opposite directional configuration. Accordingly, it can be seen that all terminals can remain in full communication with the head end despite a fiber break anywhere in the optical ring 80. Some set up may be required at a network terminal before the directional configuration can be completed. For instance, in a TDMA network, in order for each terminal to place its data in the correct time slot, the terminals must be ranged at initiation of operation (e.g., as described in ITU-T G983.1). That is, during initialization, each network terminal must determine the round trip delay over the ring to the head end in order to add the appropriate delay to assure that each terminal puts its upstream data on the ring 80 in the appropriate time slot. When the direction of communication of a network terminal with the head end changes, the distance of the terminal 90 to the head end changes. Accordingly, in a TDMA network, whenever switch 98 is switched, the corresponding terminal 90 must redetermine the round trip delay to the head end and factor that into its timing for placing data onto the ring. Referring to terminal 3, for instance, when communicating with the head end in a first directional configuration, terminal 3 is much closer to the head end than when communicating in the opposite directional configuration.

During normal operation, i.e., when there is no fiber break, it is not necessary that all of the terminals use the same directional configuration as shown in FIG. 5, i.e., it is not necessary for the network terminals' optical switches to be correlated in any way. For instance, when a fiber break is repaired, it is not necessary to perform a revertive protection switch (although it may be desirable to do so) and, therefore, different network terminals may be using opposite directional communication configurations when the optical fiber ring is in perfect condition In such a case, upstream data transmitted from one network terminal 90 may be tapped into another network terminal 90.

FIG. 6A illustrates such a situation. In particular, note that upstream information from terminal 2 to the head end will be tapped into terminal 3 through the associated passive optical tap 102. Thus, clockwise upstream information from terminal 2 could interfere with the clockwise downstream information from the head end. Accordingly, the optical interfaces in the terminals 90 should have high quality isolation in order to prevent the upstream information from terminal 2 from interfering with receipt of the downstream information from the head end at terminal 3. Upstream and downstream information on an optical ring network are typically wavelength division multiplexed. Accordingly, cross-over prevention is simply a matter of employing good wavelength filters in the terminal optical interfaces.

Also, since the downstream signal is wrapping entirely around the ring, it re-enters the head end through the passive optical splitter 84. Accordingly, at the head end, there also should be good optical isolation between the upstream and downstream communication wavelengths.

FIG. 7 illustrates a second embodiment of the present invention similar to the embodiment of FIG. 5 but further including redundancy protection for the optical interfaces of the network terminals. In this embodiment, the head end 82 couples to a single fiber ring network 80 through a single interface 83 and a passive 1:2 optical splitter, just as in the FIG. 5 embodiment. Accordingly, downstream information is transmitted in both the clockwise and counterclockwise directions. Likewise, upstream information can be received in both directions.

The circuit 96 of the FIG. 5 embodiment is replaced with circuit 170 for each of the terminals 178. This circuit comprises two passive optical taps 172 and 174 coupled to the ring in opposite directional configurations. Within the terminals 178 are redundant optical interfaces. This embodiment will operate similarly to that of FIG. 5 with the added feature that the optical interface of the terminals 178 to the ring also are protected. For instance, in the absence of any optical interface or fiber failure, all of the terminals may communicate with the head end using the first directional configuration by using interfaces 180 and optical taps 172. However, if a fiber failure occurs between network terminals 1 and 2, then terminal 2 and 3 will switch to the other optical interfaces 182 which are coupled to optical taps 174 and, thus, communicate using the opposite directional configuration on the ring 80. In addition, if an optical interface in one of the network terminals 150 fails, then the terminal also can switch to the other interface which is coupled to the other optical tap and, thus, communicate using the opposite directions on the ring 80.

This embodiment provides protection for both fiber failures and interface failures at the network terminals.

FIG. 8 illustrates another embodiment of the invention. This embodiment is similar to the FIG. 7 embodiment, except that the head end also includes redundancy protection for its optical interface. In this embodiment, the head end 190 includes two optical interfaces 192 and 194, one coupled to send downstream information in the clockwise direction and the other coupled to send downstream information in the counterclockwise direction on the fiber ring 80. This system operates essentially in the same manner as FIG. 7 except that the head end 190 uses two optical interfaces 192 and 194 to communicate in the opposite directions rather than a single optical interface and a passive optical tap. This embodiment provides the additional feature of maintaining full communication in the event of failure of one of the optical interfaces in the head end.

Figure 9:
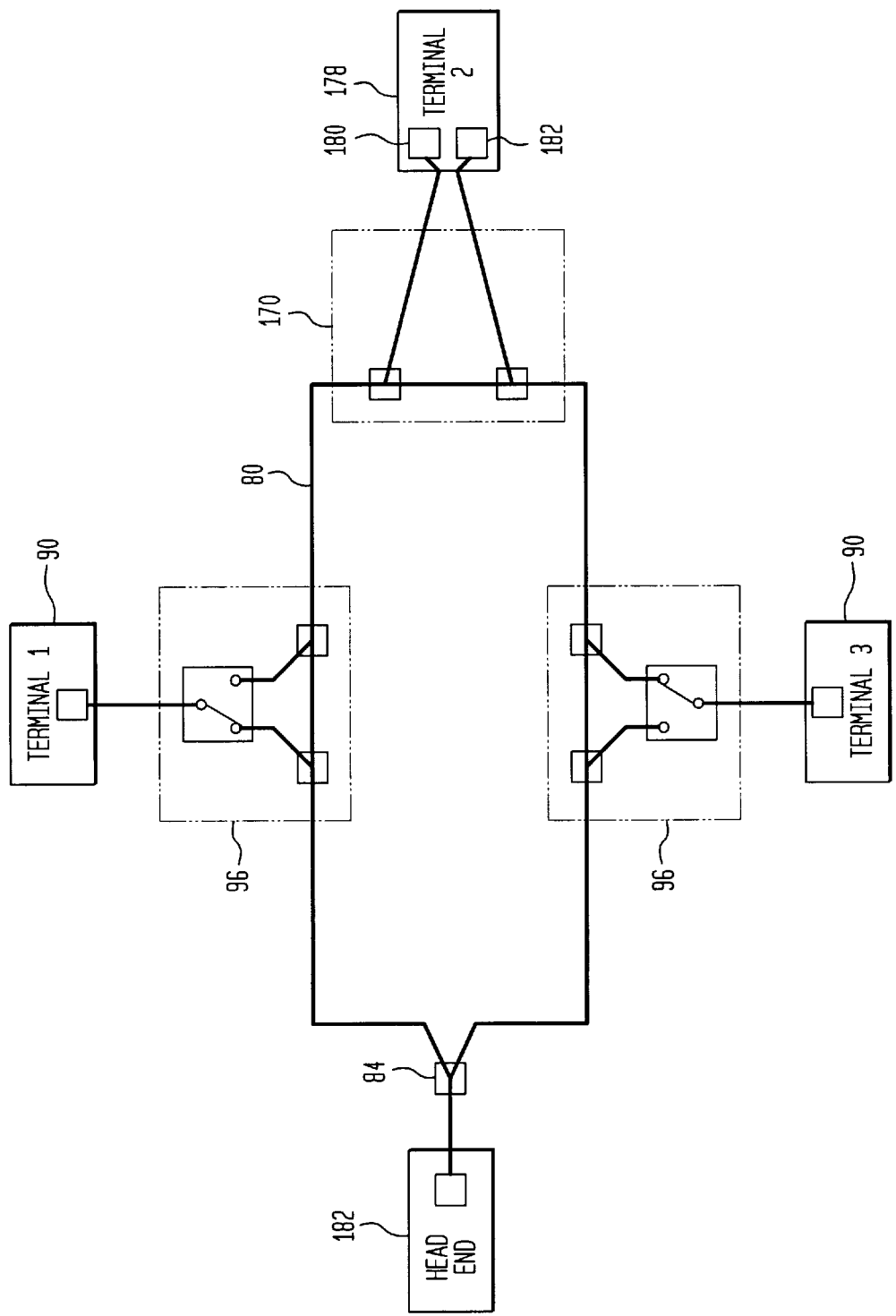
FIG. 9 is a block diagram of a passive optical ring network in accordance with a fourth embodiment of the present invention.

FIG. 9 is a block diagram illustrating another embodiment of the invention. This embodiment is basically a combination of the embodiments of FIGS. 5 and 7. This Figure illustrates that the network terminals may be coupled to the fiber ring by a combination of different circuits. For instance, terminal 1 and 3 utilize external interfaces 96 like the embodiment of FIG. 5, whereas terminal 2 utilizes an interface like interface 170 in FIG. 7. Any mixture of these types of interfaces is possible. It should also be noted that the head end could be coupled to the ring using the dual interface scheme illustrated in FIG. 8.

All of the above embodiments show that a point-to-multipoint passive optical ring network can be implemented with various degrees of optical interface and fiber break protection using a single fiber. Such a scheme saves considerable cost by providing full, geographically diverse, fiber protection without the need to run multiple fibers over multiple geographic routes. The protection switching can be under autonomous control of each terminal so no protection switching protocol between the head end and the terminals is necessary. Protection switching is activated by the network nodes according to a prescribed set of conditions, which would include, for example, loss of the downstream signal from the head end.

FIG. 10 is a block diagram illustrating a star network topology with protection in accordance with the prior art. Particularly, the head end 200 includes optical interface 202 and 204 coupled to two fibers 206 and 208, respectively. Each terminal 210 includes two optical interfaces 212 and 214. Each of those optical interfaces is coupled to each of fibers 206 and 208 by another fiber 216 and 218, respectively.

The principles of the present invention also can be applied to a star network, in order to reduce the interface redundancy requirements. FIG. 11 is a block diagram illustrating an embodiment of the present invention as applied to a star network. In particular, the terminals 228 have one optical interface 230 rather than two and are coupled selectively to one of the two fiber optic fibers 206 and 208 via a 1:2 optical switch 232. Likewise, the head end 201 has one optical interface 203 coupled to the redundant fibers 206, 208 via a 1:2 passive optical splitter 84.

If one of the two optical fibers 234 and 236 between the main fibers 206, 208 and a network terminal 228 fails, the terminal detects the absence of a downstream signal and switches the switch 232 so as to communicate using the other fiber. This scheme saves cost because only one interface circuit is needed at each network terminal and the head end.

The present invention provides fiber break protection for a point-to-multipoint network utilizing as little as one optical fiber, whereas two or more were required in the prior art. Also, there is no redundancy of optical interfaces required at the head end or the network terminals. However, interface redundancy can be provided at either or both nodes, if desired. The scheme of the present invention is simple and does not necessarily require any special protocols since the switching can be performed autonomously by each terminal.

Further, in the case of the fully duplicated passive optical network schemes of the prior art, when there is a break in the feeder fiber (the section of fiber between the head end and the first optical splitter), all terminals must switch to the protection network. In the single fiber ring scheme in accordance with the present invention, only those terminals downstream from the fiber break are affected. The others will not experience any loss of service.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. An apparatus for coupling a network terminal to a point-to-multipoint optical ring network comprising:
   a 1:2 optical switch having first, second and third terminals and adapted to selectively optically couple together said first and second terminals or said first and third terminals, said first terminal for coupling to a network terminal;
   a first passive optical tap having a first terminal coupled to said second terminal of said switch, a second terminal for coupling into an optical fiber ring of said network, and a third terminal for coupling into said optical fiber ring; and
   a second passive optical tap having a first terminal coupled to said third terminal of said switch, a second terminal for coupling into an optical fiber ring of said network, and a third terminal for coupling into said optical fiber ring.

2. An apparatus for coupling a network terminal to a point-to-multipoint optical ring network comprising:
   a 1:2 optical switch having first, second and third terminals and adapted to selectively optically couple together said first and second terminals or said first and third terminals, said first terminal for coupling to a network terminal;
   a first passive optical tap having a first terminal coupled to said second terminal of said switch, a second terminal for coupling into an optical fiber ring of said network, and a third terminal for coupling into said optical fiber ring, such that said network terminal can use a first directional condition for communication with a head end of said network over said optical fiber ring; and
   a second passive optical tap having a first terminal coupled to said third terminal of said switch, a second terminal for coupling into an optical fiber ring of said network, and a third terminal for coupling into said optical fiber ring such that said network terminal can use a second directional condition for communication with said head end over said optical fiber ring.

3. The apparatus of claim 2 further comprising:
   means for detecting whether communication with said head end is established; and
   means for controlling said switch to switch said directional condition when communication with said head end is not established.

4. The apparatus of claim 3 wherein said switch and said first and second optical taps are external of said network terminal.

5. The apparatus of claim 4 further comprising a network terminal and wherein said means for detecting and said means for controlling are embodied within said network terminal.

6. A point-to-multipoint optical ring network comprising:
an optical fiber ring having first and second ends;
a head end coupled to said first and second ends of said ring;
a plurality of network terminals;
a switch circuit corresponding to at least one of said network terminals, said switch circuit comprising:
   a 1:2 optical switch having first, second and third terminals and adapted to selectively optically couple together said first and second terminals or said first and third terminals, said first terminal coupled to said corresponding network terminal;
   a first passive optical tap having a first terminal coupled to said second terminal of said switch and a second terminal coupled into said optical fiber ring to use a first directional condition for communications; and
   a second passive optical tap having a first terminal coupled to said third terminal of said switch and a second terminal coupled into said optical fiber ring to use a second directional condition for communications.

7. The network of claim 6 wherein said first directional condition is a condition in which downstream communications between said head end and said corresponding network terminal is in the clockwise direction and upstream communications between said head end and said corresponding network terminal is in the counterclockwise direction and wherein said second direction is a direction by which downstream communications between said head end and said corresponding network terminal is in the counterclockwise direction and upstream communications between said head end and said corresponding network terminal is in the clockwise direction.

8. The network of claim 6 further comprising a 1:2 passive optical splitter coupled between said head end and said first and second ends of said optical fiber ring such that said head end can communicate with said network terminals using said first and said second directional conditions.

9. The network of claim 8 wherein said switch is coupled under control of said corresponding network terminal and wherein said network terminal is adapted to switch said switch when it detects a loss of communications with said head end.

10. The network of claim 9 wherein said network is a time division multiple access network and said corresponding network terminal is further adapted to re-range itself from said head end when said switch is switched.

11. The network of claim 6 wherein said network is a passive network.

12. The network of claim 6 wherein said optical fiber ring comprises one and only one fiber.

13. The interface of claim 6 wherein said switch circuit is external of said network terminal.

14. An apparatus for coupling a network terminal to a point-to-multipoint optical ring network comprising:
first and second optical interfaces;
a first passive optical tap having a first terminal coupled to said first optical interface, a second terminal for coupling into an optical fiber ring of said network, and a third terminal for coupling into said optical fiber ring to use a first direction for communication with a head end of said network over said optical fiber ring; and
a second passive optical tap having a first terminal coupled to said second optical interface, a second terminal for coupling into an optical fiber ring of said network, and a third terminal for coupling into said Optical fiber ring to use a second direction for communications.

15. The apparatus of claim 14 further comprising a network terminal and wherein said network terminal is adapted to utilize one of said interfaces for communicating with said head end, said network terminal being further adapted to switch between utilizing said first interface and utilizing said second interface when said network element detects a loss of communications with said head end.

16. The network of claim 15 wherein said network is a time division multiple access network and said corresponding network terminal is further adapted to re-range itself from a head end of said network responsive to a switch.

17. An apparatus for coupling a network terminal onto a point-to-multipoint optical ring network comprising:
means for selectively coupling said network terminal to an optical fiber ring of said network to communicate with a head end of said network using one of a first directional condition and a second directional condition;
means for detecting whether communication with said head end is established; and
means for controlling said means for selectively coupling to switch said direction of communication when communication with said head end is not established.

18. The apparatus of claim 17 wherein said means for selectively coupling comprises:
1:2 optical switch having first, second and third terminals and adapted to selectively optically couple together said first and second terminals or said first and third terminals, said first terminal for coupling to a network terminal;
first passive optical tap having a first terminal coupled to said second terminal of said switch, a second terminal for coupling into said optical fiber ring, and a third terminal for coupling into said optical fiber ring to use said first directional condition for communication with a head end of said network over said optical fiber ring; and
a second passive optical tap having a first terminal coupled to said third terminal of said switch, a second terminal for coupling into said optical fiber ring, and a third terminal for coupling into said optical fiber ring to use said second directional condition for communications.

19. The apparatus of claim 18 wherein said means for selectively coupling is external of said network terminal.

20. The apparatus of claim 17 wherein said means for selectively coupling comprises:
first and second optical interfaces;
a first passive optical tap having a first terminal coupled to said first optical interface, a second terminal for coupling into an optical fiber ring of said network, and a third terminal for coupling into said optical fiber ring so as to use a first directional condition for communication with a head end of said network; and
a second passive optical tap having a first terminal coupled to said second optical interface, a second terminal for coupling into an optical fiber ring of said network, and a third terminal for coupling into said optical fiber ring so as to use a second directional condition for communication with said head end of said network.

21. The interface of claim 17 further comprising a network terminal and wherein said means for detecting and said means for controlling are embodied within said network terminal.

22. An apparatus for coupling a network terminal onto a point-to-multipoint star network, said star network having at least two cables coupled to a head end of said network for coupling network terminals to said head end, said interface comprising:
  means for selectively coupling said network terminal to one of said first and second cables of said network;
  means for detecting whether communication between said network terminal and said head end is established; and
  means for controlling said means for selectively coupling to switch said cable by which said network terminal is coupled to said head end when communication with said head end is not established.

23. The apparatus of claim 22 wherein said means for selectively coupling comprises:
  a 1:2 optical switch having first, second and third terminals and adapted to selectively couple together said first and second terminals or said first and third terminals, said first terminal for coupling to a network terminal;
  a first passive optical tap having a first terminal coupled to said second terminal of said switch, a second terminal for coupling into said first fiber of said network, and a third terminal for coupling into said first fiber of said network; and
  a second passive optical tap having a first terminal coupled to said third terminal of said switch, a second terminal for coupling into said second fiber of said network, and a third terminal for coupling into said second fiber of said network.

24. The apparatus of claim 23 wherein said means for selectively coupling is external of said network terminal.

25. The apparatus of claim 22 wherein said network is an optical network.

26. The apparatus of claim 22 further comprising a network terminal and wherein said means for detecting and said means for controlling are embodied within said network terminal.

27. A point-to-multipoint optical ring network comprising:
  an optical fiber ring having first and second ends;
  a head end coupled to said first and second ends of said ring;
  a plurality of network terminals;
  a switch circuit corresponding to at least one of said network terminals, said switch circuit comprising:
    means for selectively coupling said network terminal to an optical fiber ring of said network to communicate with said head end using one of a first directional condition and a second directional condition;
    means for detecting whether communication with said head end is established; and
    means for controlling said means for selectively coupling to switch said direction of communication when communication with said head end is not established.

28. The network of claim 27 wherein said first directional condition is a condition in which downstream communications between said head end and said corresponding network terminal is in the clockwise direction and upstream communications between said head end and said corresponding network terminal is in the counterclockwise direction and wherein said second direction is a direction by which downstream communications between said head end and said corresponding network terminal is in the counterclockwise direction and upstream communications between said head end and said corresponding network terminal is in the clockwise direction.

29. The network of claim 27 further comprising a 1:2 passive optical splitter coupled between said head end and said first and second ends of said optical fiber ring such that said head end can communicate with said network terminals using said first and said second directional conditions.

30. The network of claim 29 wherein said network is a time division multiple access network and said corresponding network terminal is further adapted to re-range itself from said head end responsive to a switch.

31. The network of claim 27 wherein said network is a passive network.

32. The network of claim 27 wherein said optical fiber ring comprises one and only one fiber.

33. The interface of claim 27 wherein said switch circuit is external of said network terminal.

34. The apparatus of claim 27 wherein said means for selectively coupling comprises;
  a 1:2 optical switch having first, second and third terminal and adapted to selectively optically couple together said first and second terminals or said first and third terminals, said first terminal coupled to said network terminal;
  a first passive optical tap having a first terminal coupled to said second terminal of said switch, a second terminal coupled into said optical fiber ring, and a third terminal coupled into said optical fiber ring so as to use said first directional condition for communication with said head end over said optical fiber ring; and
  a second passive optical tap having a first terminal coupled to said third terminal of said switch, a second terminal for coupling into said optical fiber ring, and a third terminal for coupling into said optical fiber ring to use said second directional condition for communications.

35. The apparatus of claim 27 wherein said means for selectively coupling comprises:
  first and second optical interfaces;
  a first passive optical tap having a first terminal coupled to said first optical interface, a second terminal coupled into an optical fiber ring of said network, and a third terminal coupled into said optical fiber ring so as to use a first directional condition for communication with said head end over said optical fiber ring; and
  a second passive optical tap having a first terminal coupled to said second optical interface, a second terminal for coupling into an optical fiber ring of said network, and a third terminal coupled into said optical fiber ring so as to use a second directional condition for communication with said head end over said optical fiber ring.

36. A method for interfacing a network terminal to a point-to-multipoint network, said method comprising the steps of:
  coupling a head end of said network to opposite ends of an optical fiber ring forming said network such that said head end can communicate with network terminals via said optical fiber ring using first and second directional conditions;

selectively coupling a network terminal to said optical fiber ring to communicate with a head end of said network using one of said first and second directional conditions;

detecting whether communication with said head end is established; and switching said direction of communication when communication with said head end is not established.

37. The method of claim 36 wherein said step of selectively coupling comprises:

providing a first path between said network terminal and said optical fiber ring such that communication between said head end and said network terminal would occur using said first directional condition, providing a second path between said network terminal and said optical fiber ring such that communication between said head end and said network terminal would occur using said second directional condition;

providing a 1:2 optical switch for switching between said first and second paths.

38. The method of claim 36 wherein said step of selectively coupling comprises:

providing first and second optical interfaces adjacent said network terminal;

providing a first passive optical tap for coupling said network terminal to said optical fiber through said first interface so as to use said first directional condition for communication with said head end; and providing a second passive optical tap for coupling said network terminal to said optical fiber through said second interface so as to use said second directional condition for communication with said head end.

39. The method of claim 38 wherein said controlling step comprises switching between activating said first and said second interfaces.

* * * * *